United States Patent
Roberts et al.

(10) Patent No.: US 9,834,136 B2
(45) Date of Patent: *Dec. 5, 2017

(54) ILLUMINATED CHROMATIC EMBLEM ASSEMBLY

(71) Applicants: Ford Global Technologies, LLC, Dearborn, MI (US); Colonial Plastics, Inc., Clinton Township, MI (US)

(72) Inventors: Richard J. Roberts, Clinton Township, MI (US); LaRon Michelle Brown, Birmingham, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/276,434

(22) Filed: May 13, 2014

(65) Prior Publication Data

US 2014/0247614 A1  Sep. 4, 2014

Related U.S. Application Data

(63) Continuation-in-part of application No. 13/526,857, filed on Jun. 19, 2012, now Pat. No. 8,752,989.

(51) Int. Cl.
*F21V 9/00* (2015.01)
*B60Q 1/26* (2006.01)
(Continued)

(52) U.S. Cl.
CPC ............ *B60Q 1/2615* (2013.01); *B60Q 1/26* (2013.01); *B60Q 3/30* (2017.02); *G09F 13/08* (2013.01);
(Continued)

(58) Field of Classification Search
CPC .......... B60Q 1/26; B60Q 1/2615; B60Q 3/06; G09F 13/08; G09F 2013/044
(Continued)

(56) References Cited

U.S. PATENT DOCUMENTS 3,341,915 A  9/1967  Knochel et al.
4,208,869 A  6/1980  Hanaoka
(Continued)

FOREIGN PATENT DOCUMENTS

GB        2458302 A    9/2009
JP       61213829 A    9/1986
(Continued)

OTHER PUBLICATIONS

Ray, William J.,"Printed Semiconductors," Nth Degree Technologies, available at http://semiconwest.org/sites/semiconwest.org/files/6_William%20Ray_Nth%20Degree.pdf, retrieved on Jun. 26, 2013, 40 pages.

(Continued)

*Primary Examiner* — Elmito Breval
*Assistant Examiner* — Jessica M Apenteng
(74) *Attorney, Agent, or Firm* — Vichit Chea; Price Heneveld LLP

(57) ABSTRACT

An emblem assembly is provided that includes a power source, a backing member, and a light-producing assembly coupled to the power source and supported by the backing member. The light-producing assembly may include an electroluminescent light source. The emblem assembly further includes a chromatic layer over the light-producing assembly that comprises and emblem shape, and a translucent sealing structure over the chromatic layer that seals the backing member, the light-producing assembly, and the chromatic layer. The emblem assembly exhibits a chrome- or mirror-like finish when viewed under ambient lighting (Continued)

conditions. Further, the emblem assembly possesses a glowing appearance when activated under low light or nighttime conditions.

20 Claims, 7 Drawing Sheets

(51) Int. Cl.
*G09F 21/04* (2006.01)
*G09F 13/08* (2006.01)
*B60Q 3/30* (2017.01)
*G09F 13/04* (2006.01)

(52) U.S. Cl.
CPC ........ *G09F 21/04* (2013.01); *G09F 2013/044* (2013.01)

(58) Field of Classification Search
USPC ........................................ 362/231, 509, 97.1
See application file for complete search history.

(56) References Cited

U.S. PATENT DOCUMENTS

| | | | |
|---|---|---|---|
| 4,788,550 A | 11/1988 | Chadima, Jr. | |
| 4,977,695 A | 12/1990 | Armbruster | |
| 5,009,020 A * | 4/1991 | Watanabe ............ | B60Q 1/2696 362/565 |
| 5,471,554 A | 11/1995 | Rukavina et al. | |
| 5,641,221 A | 6/1997 | Schindele et al. | |
| 5,841,738 A | 11/1998 | Kamei et al. | |
| 6,045,643 A | 4/2000 | Byker et al. | |
| 6,136,161 A | 10/2000 | Yu et al. | |
| 6,158,868 A | 12/2000 | Chien | |
| 6,930,815 B2 | 8/2005 | Berneth et al. | |
| 7,249,869 B2 | 7/2007 | Takahashi et al. | |
| 7,582,000 B2 | 9/2009 | Pendlebury et al. | |
| 7,748,148 B2 | 7/2010 | Reiland et al. | |
| 7,752,791 B2 | 7/2010 | Misawa et al. | |
| 7,848,021 B2 | 12/2010 | Asakura et al. | |
| 7,866,858 B2 | 1/2011 | Hirzmann | |
| 7,952,785 B2 | 5/2011 | Karmhag et al. | |
| 8,016,467 B2 | 9/2011 | Eberwein | |
| 8,061,861 B2 | 11/2011 | Paxton et al. | |
| 8,113,695 B2 | 2/2012 | Meinke et al. | |
| 8,246,226 B2 | 8/2012 | Stempinski | |
| 8,266,833 B2 | 9/2012 | Pierce et al. | |
| 8,303,147 B2 | 11/2012 | Jeon | |
| 8,449,161 B2 | 5/2013 | Igoe et al. | |
| 2004/0104816 A1 | 6/2004 | Wilson | |
| 2004/0232434 A1 | 11/2004 | Chen | |
| 2008/0128286 A1 | 6/2008 | Wu et al. | |
| 2010/0102538 A1* | 4/2010 | Paxton ................. | B60Q 3/004 280/728.3 |
| 2011/0003070 A1 | 1/2011 | Pozo Gonzalo et al. | |
| 2011/0128311 A1 | 6/2011 | Wakatsuki et al. | |
| 2012/0144705 A1 | 6/2012 | Pierce et al. | |
| 2012/0182722 A1 | 7/2012 | Wu | |
| 2013/0335997 A1 | 12/2013 | Roberts et al. | |

FOREIGN PATENT DOCUMENTS

| | | |
|---|---|---|
| JP | 5061074 A | 3/1993 |
| WO | 2006063325 A2 | 6/2006 |
| WO | 2012049946 A1 | 4/2012 |

OTHER PUBLICATIONS

Ray, William J. et al.,"Printed Inorganic Light Emitting Diodes for Solid State Lighting," Nth Degree Technologies Worldwide, pp. 562-564, SID Symposium Digest of Technical Papers, vol. 43, Issue 1, Jun. 2012.
Goodwin, Antuan, "Ford Developing Glow-in-the-Dark Chrome," Nov. 1, 2011, http://www.cnet.com/news/ford-developing-glow-in-the-dark-chrome/, 3 pages.

* cited by examiner

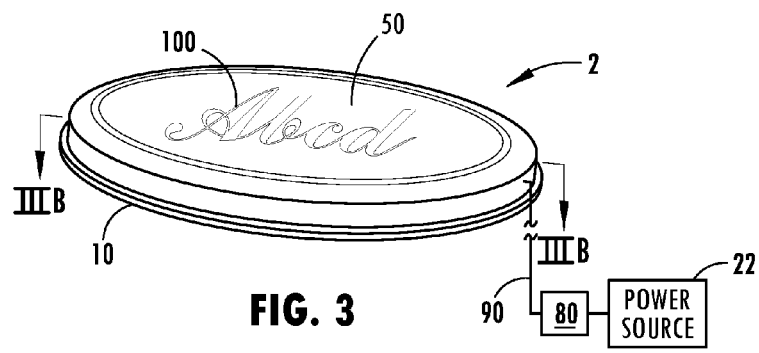
FIG. 3
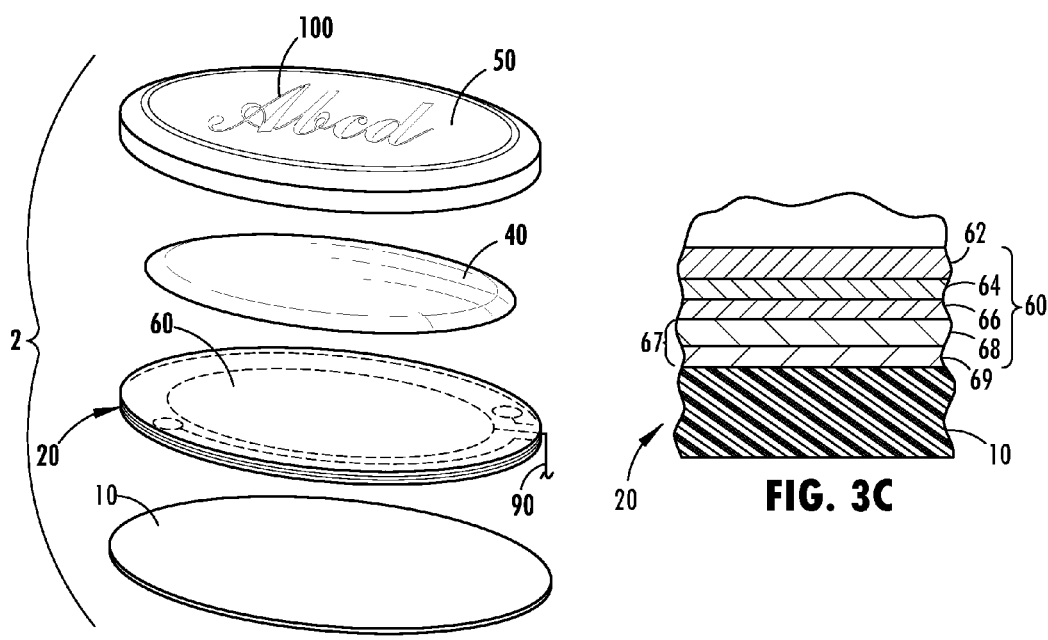
FIG. 3A
FIG. 3C
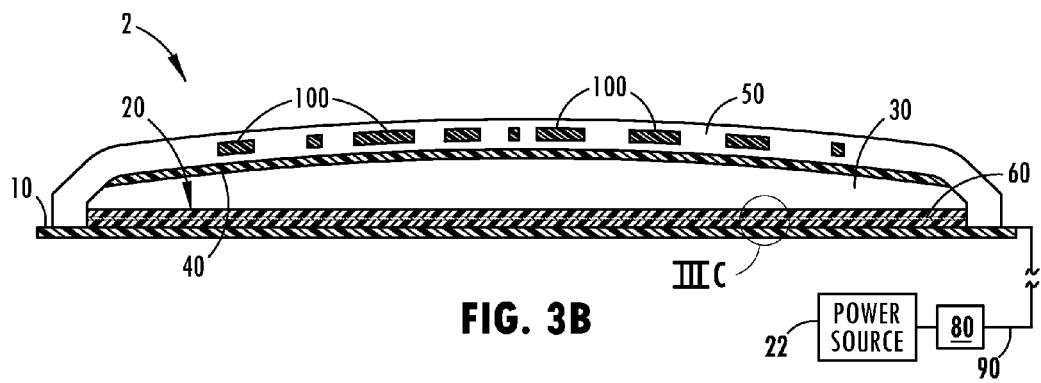
FIG. 3B

ILLUMINATED CHROMATIC EMBLEM ASSEMBLY

CLAIM OF PRIORITY

The present application is a continuation-in-part application that claims priority to and the benefit under 35 U.S.C. §120 of U.S. patent application Ser. No. 13/526,857 filed on Jun. 19, 2012, now U.S. Pat. No. 8,752,989, entitled "ILLUMINATED CHROMATIC VEHICLE EMBLEM," the entire disclosure of which is hereby incorporated herein by reference.

FIELD OF THE INVENTION

The present invention generally relates to an emblem, and more particularly relates to an illuminated, chromatic emblem for use on a vehicle.

BACKGROUND OF THE INVENTION

Emblems and badges are commonly employed on vehicles to convey various aesthetic and stylistic features. They may also be used to display a vehicle manufacturer's logos, names, trademarks or other graphics. Enhancements to the attractiveness of these badges or emblems may also be desirable.

The engineering and design of emblems and badges for use in a vehicle requires a consideration of various environmental factors. These units should be sufficiently durable to maintain their attractiveness over the lifetime of the vehicle. In some cases, the emblems and badges may be used in an under-the-hood configuration and require additional temperature resistance.

SUMMARY OF THE INVENTION

One aspect of the present invention is to provide an emblem assembly that includes a power source, a backing member, and a light-producing assembly coupled to the power source and supported by the backing member. The light-producing assembly includes an electroluminescent light source. The emblem assembly further includes a chromatic layer over the light-producing assembly that includes an emblem shape, and a translucent sealing structure over the chromatic layer that seals the backing member, the light-producing assembly, and the chromatic layer.

Another aspect of the present invention is to provide an emblem assembly that includes a power source, a backing member, and a light-producing assembly coupled to the power source and supported by the backing member. The light-producing assembly includes a light-emitting diode source. The emblem assembly further includes a chromatic layer over the light-producing assembly that comprises an emblem shape, and a translucent sealing structure over the chromatic layer that seals the backing member, the light-producing assembly, and the chromatic layer.

A further aspect of the present invention is to provide an emblem assembly that includes a power source, a backing member, and a light-producing assembly coupled to the power source and supported by the backing member. The light-producing assembly includes a fiber optic light source. The emblem assembly further includes a chromatic layer over the light-producing assembly that comprises an emblem shape, and a translucent sealing structure over the chromatic layer that seals the backing member, the light-producing assembly, and the chromatic layer.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a top-down perspective view of an illuminated vehicle emblem assembly, according to a third embodiment;

FIG. 3A is an exploded, perspective view of the illuminated vehicle emblem assembly shown in FIG. 3;

FIG. 3B is a cross-sectional view of the illuminated vehicle emblem assembly shown in FIG. 3;

FIG. 3C is a cross-sectional view of the light-producing assembly contained in the illuminated vehicle emblem assembly shown in FIG. 3;

DETAILED DESCRIPTION OF THE PREFERRED EMBODIMENTS

Figure 2:
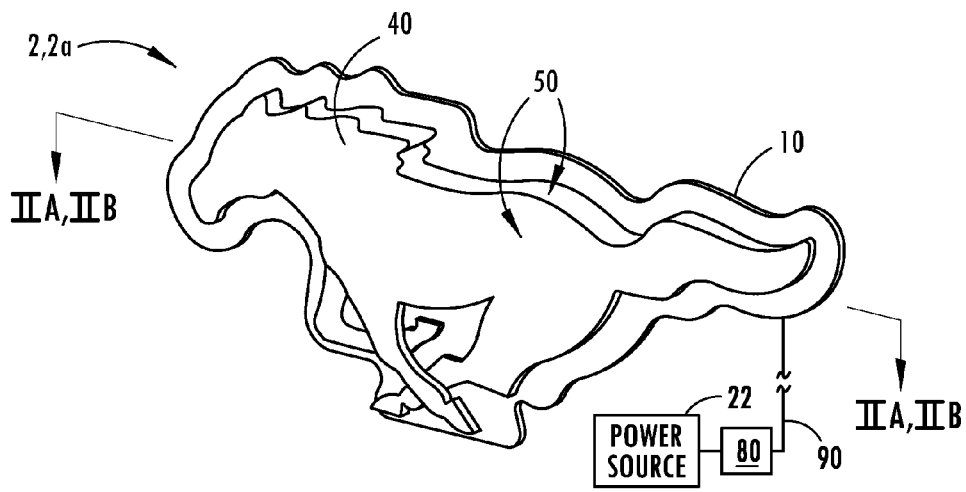
FIG. 2 is an enlarged, top-down perspective view of an illuminated vehicle emblem assembly according to two embodiments.
Figure 2A:
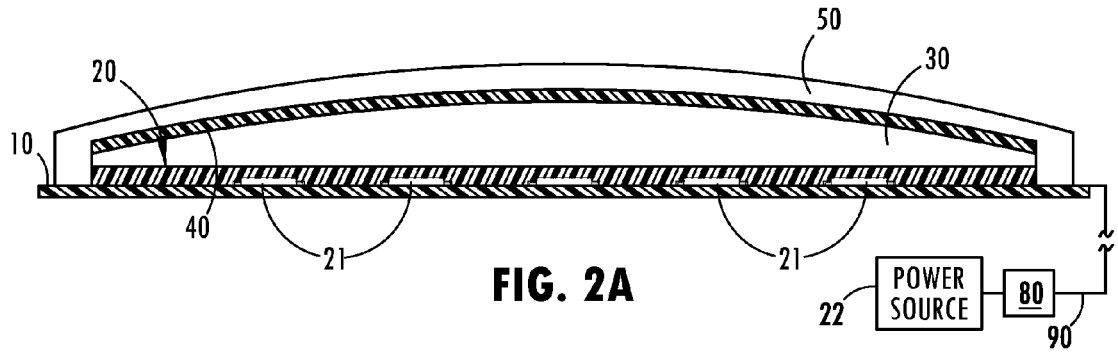
FIG. 2A is a cross-section of the illuminated vehicle emblem assembly shown in FIG. 2 according to a first embodiment.
Figure 2B:
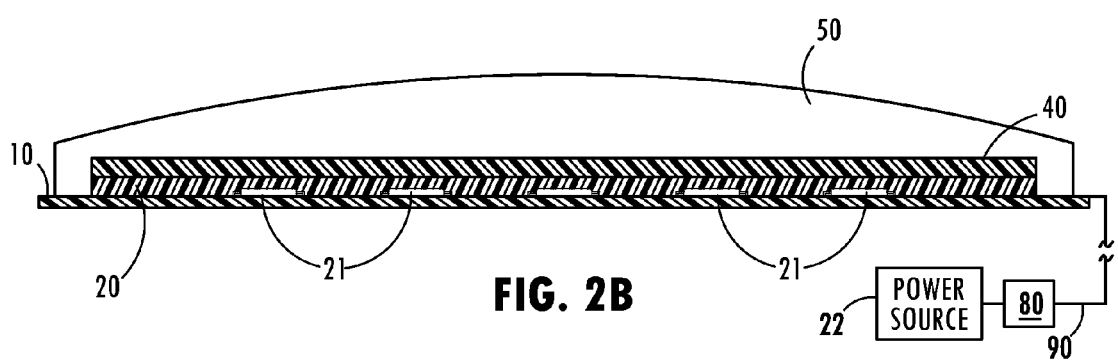
FIG. 2B is a cross-section of the illuminated vehicle emblem assembly shown in FIG. 2 according to a second embodiment.

For purposes of description herein, the terms "upper," "lower," "right," "left," "rear," "front," "vertical," "horizontal," and derivatives thereof shall relate to the invention as oriented in FIG. 2B. However, the invention may assume various alternative orientations, except where expressly specified to the contrary. In addition, the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
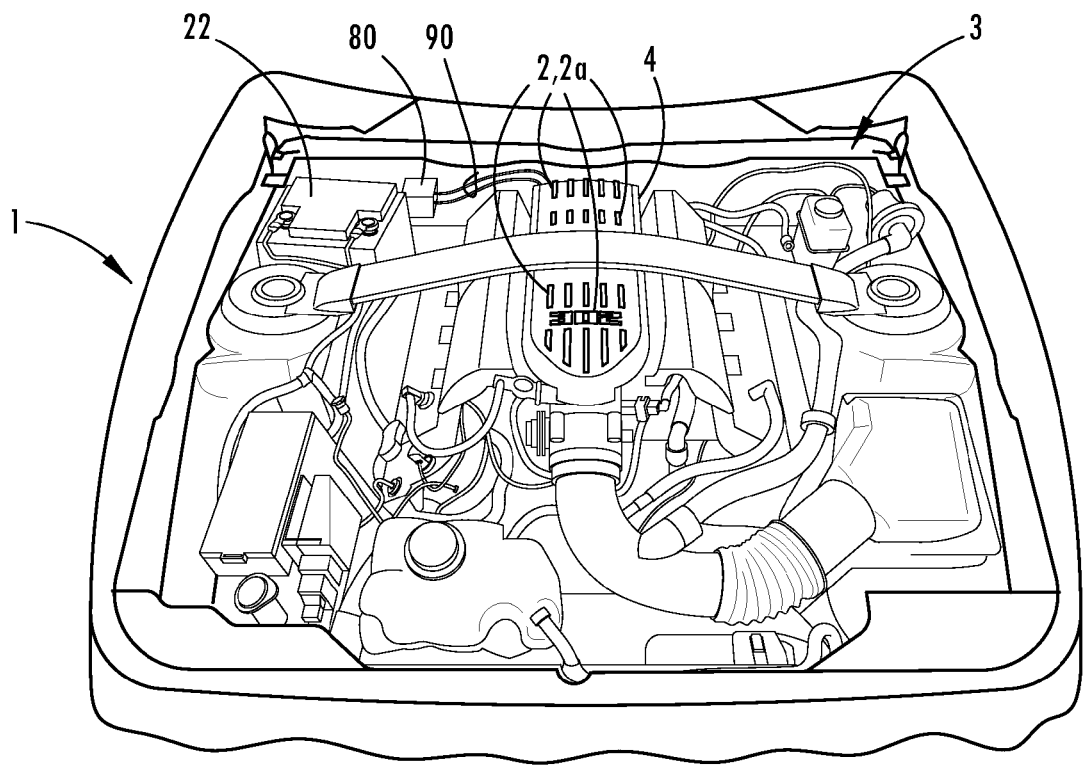
FIG. 1 is a perspective view of the engine compartment of a vehicle (hood removed for clarity) with illuminated emblem assemblies mounted to an engine at various locations.

Referring now to FIG. 1, an engine compartment 3 of vehicle 1 is generally illustrated with its hood removed for clarity. Various illuminated vehicle emblem assemblies 2, 2a are shown mounted to an engine 4 within the engine compartment 3. Vehicle 1 may be an automobile, truck, bus, van or other type of vehicle capable of displaying illuminated vehicle emblem assemblies 2, 2a. As shown, the illuminated emblem assemblies 2, 2a are configured in various shapes and designs. Further, emblem assemblies 2, 2a are mounted to engine 4. It should be appreciated that emblem assemblies 2, 2a may be configured in any of a myriad of shapes and designs for use within engine compartment 3, or in other interior locations within vehicle 1. Under ambient lighting conditions, emblem assemblies 2, 2a exhibit a chrome-like or mirrored appearance under the hood of vehicle 1 within engine compartment 3. More specifically, a chromatic layer 40 (and its shape, design and/or surface appearance) within the assemblies 2, 2a (see FIGS. 2, 2A and 2B) can be viewed under ambient lighting conditions. Under low light or nighttime conditions, emblem assemblies 2, 2a are illuminated and their exterior surfaces appear with a uniform glow.

Vehicle emblem assemblies 2, 2a are coupled to a power supply 22 via wiring 90 and controller 80, as also shown in FIG. 1. Controller 80 is arranged to control assemblies 2, 2a in this configuration. Power supply 22 may be a standard vehicle battery, or a separate battery or another power source within the vehicle. When vehicle emblem assembly 2, 2a is switched to an illuminated state by controller 80, power supply 22 provides the power necessary for the illumination. Vehicle emblem assembly 2, 2a may be switched to an illuminated state by the engagement of a manual switch (not shown), the controller 80 (as shown in FIG. 1) operating according to a predetermined switching algorithm, or another suitable switching configuration.

Figure 1A:
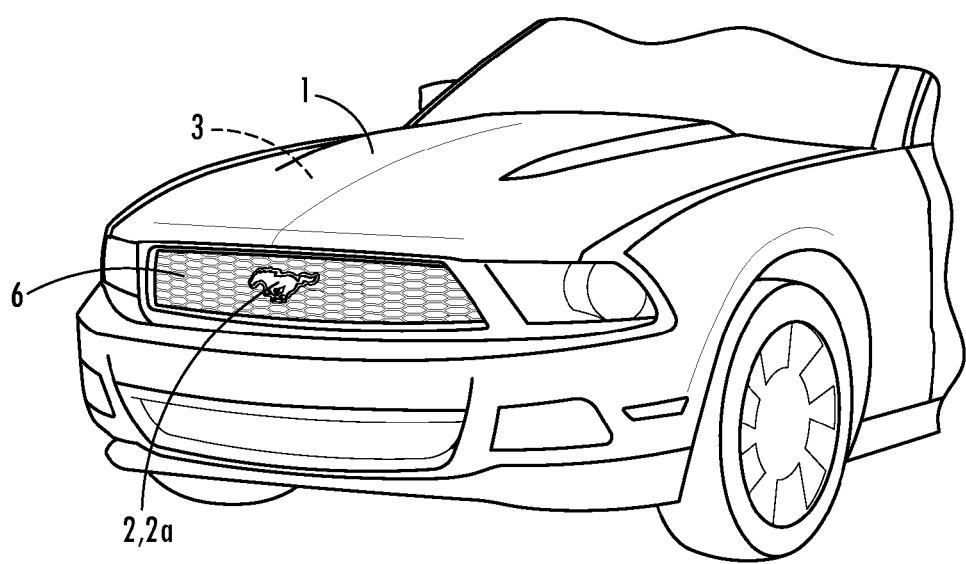
FIG. 1A is a perspective view of a vehicle with an illuminated emblem assembly mounted to the grille of the vehicle.

FIG. 1A generally depicts the front view of vehicle 1 and an illuminated emblem assembly 2, 2a. Here, emblem assembly 2, 2a is mounted to an exterior surface of vehicle 1, namely, grille 6. It should be appreciated that emblem assemblies 2, 2a may be configured in any of a myriad of shapes, sizes and designs for use on the exterior of vehicle 1. These illuminated emblem assemblies 2, 2a also exhibit a chrome-like or mirrored appearance when viewed under ambient lighting conditions (e.g., sunlight). Illuminated emblem assemblies 2, 2a mounted to the exterior surfaces of vehicle 1 appear with a uniform glow under low light or nighttime conditions. Further, these assemblies 2, 2a may be powered and controlled in the same fashion as the illuminated emblem assemblies 2, 2a mounted in the engine compartment 3 of vehicle 1 (see FIG. 1), or other interior locations within vehicle 1.

In FIG. 2, illuminated vehicle emblem assemblies 2, 2a are depicted. As shown in this schematic, vehicle emblem assembly 2 and 2a include an encapsulation structure 50 and a backing member 10. Backing member 10 is configured to attach the illuminated emblem assembly 2, 2a to a vehicle (not shown). Backing member 10 may be arranged as a plate, base or other suitable supporting member to mount illuminated vehicle emblem assembly 2, 2a to the vehicle. Further, backing member 10 may be configured to match the shape, features and contours of the underlying surface of the vehicle 1 at the location specified for mounting the illuminated vehicle emblem assembly 2, 2a.

Durable metals, polymers, alloys, composites and other suitable structural materials may be employed for use as backing member 10, provided that they offer high durability under long-term (greater than 10 years) ambient exposure and can be sealed with a water resistant barrier to prevent moisture ingress within the emblem. For example, the backing member 10 may comprise acrylonitrile butadiene styrene (ABS), a combination of polycarbonate and ABS, or other polymeric materials with similar properties. The backing member 10 may be opaque or mirrored to ensure that the majority of the light generated by the illuminated vehicle emblem assembly 2, 2a is focused outward, away from the vehicle. Typically, backing member 10 is injection-molded or die cut, with a first thickness of approximately 1 to 3 mm. Other thicknesses are possible depending on the desired aesthetics for the emblem assembly and/or mounting needs. Preferably, backing member 10 is injection-molded and possesses a thickness of approximately 2.5 to 3 mm.

Encapsulation structure 50 should be substantially translucent. Structure 50 should also provide a water-resistant seal between the backing member 10 and the interior components of illuminated vehicle emblem assembly 2, 2a. The encapsulation structure 50 comprises translucent polymeric materials and/or resins resistant to discoloration, crazing, cracking and other deterioration associated with exposure to ambient air, sunlight and moisture. For example, the encapsulation structure 50 may comprise acrylic, nylon, polycarbonate and/or blends of these materials.

When illuminated vehicle emblem assemblies 2, 2a are employed in applications on the exterior of vehicle 1, a variety of polymeric materials may be suitable for use as encapsulation structure 50. These materials must be durable and not yellow, discolor, craze, crack or otherwise deteriorate under ambient, environmental conditions. Preferably, encapsulation structure 50 is comprised of an acrylic material, nylon material, polycarbonate material or blend of these materials when the illuminated vehicle emblem assembly 2, 2a is mounted to the exterior (e.g., the grille) or interior (e.g., the steering wheel) of vehicle 1. Most preferably, the encapsulation structure is comprised of a UV-stable polycarbonate material when the assembly 2, 2a is mounted to the exterior of vehicle 1. For example, encapsulation structure 50 can comprise a blend of nylon and polycarbonate constituents or primarily UV-stable polycarbonate material. In particular, these constituents may be blended at a ratio of 40 to 60% nylon to 40 to 60% polycarbonate by weight. As another example, encapsulation structure 50 can comprise a blend of nylon and polyester materials, particularly when assemblies 2, 2a are employed in high temperature environments such as the engine compartment 3 of the vehicle 1. These constituents may be blended at a ratio of 40 to 60% nylon and 40 to 60% polyester by weight.

In situations where illuminated vehicle emblem assembly 2, 2a is mounted in the engine compartment 3 of vehicle 1, the encapsulation structure 50 must be durable under the increased temperatures associated with the operation of the engine 4. The materials used for encapsulation structure 50 therefore must be heat resistant and not subject to discoloration or other deterioration under these conditions. Accordingly, encapsulation structure 50 may be comprised of acrylic materials or other plastic materials with high percentages of acrylic.

In addition, glass particles may be mixed into encapsulation structure 50 for added durability and temperature resistance. The glass particles may also provide additional light-scattering effects to further enhance the attractiveness of the emblem assembly 2, 2a. Still further, the encapsulation structure 50 may be coated with a curable, liquid-based coating that results in a translucent layer for added durability.

Encapsulation structure 50 may be fabricated according to various methods as known in the polymer processing art. For example, encapsulation structure 50 may be made using injection molding tools, equipment and processing conditions. Further, encapsulation structure 50 is attached to the backing member 10 using various mechanical, chemical and thermal techniques that provide a watertight and durable seal between the member 10 and structure 50. These attachment techniques include sonic welding, vibration welding, hot plate welding, rotational welding, and silicone joining.

FIGS. 2A and 2B provide a cross-sectional view of the illuminated vehicle emblem 2, 2a depicted in FIG. 2. Backing member 10 is coupled, bonded or otherwise attached to encapsulation structure 50, as discussed earlier. A light-producing assembly 20 is configured above backing member 10. As depicted in FIGS. 2A and 2B, light-producing assembly 20 is mounted directly to backing member 10. It should be appreciated that light-producing assembly 20 may be coupled to or otherwise reside above backing member 10.

As shown in FIGS. 2A and 2B, light-producing assembly 20 is also coupled to power supply 22 via wiring 90 and controller 80. Controller 80 operates to control the illuminated state(s) of vehicle emblem assembly 2, 2a as described in the embodiment depicted in FIG. 1. Light-producing assembly 20 relies on power from power supply 22 to provide the illumination function of vehicle emblem assembly 2, 2a. The light-producing assembly 20 may be fabricated with a thickness from approximately 0.1 mm to 3.1 mm. When activated, light-producing assembly 20 generates light rays within illuminated vehicle emblem assembly 2, 2a. These light rays travel through the various structures within the emblem assembly 2, 2a (including the chromatic layer 40) and exit through encapsulation structure 50. The light output from the light-producing assembly is then viewed as a glowing, emanation of light through a significant portion of the exterior surface area of vehicle emblem assembly 2, 2a. In addition, some light from the emblem assembly 2, 2a may emanate around or near the edges of the backing member 10.

Various types of light sources 21 may be employed within light-producing assembly 20 to provide the illumination function. These light sources 21 may include incandescent, LED, LED-sourced fiber optic, LED-sourced light pipe, and electroluminescent light-producing elements. Further, these light sources 21 may be configured within light-producing assembly 20 to provide white light or light in various colors. In addition, color light filters and/or lenses may be fitted within light-producing assembly 20 over light sources 21 to generate configurations of various, desired colors, and shapes through the vehicle emblem assembly 2, 2a.

In the illuminated vehicle emblem assembly 2 depicted in FIG. 2A, a translucent base region 30 is arranged over the light sources 21 and light-producing assembly 20. Preferably, base region 30 is void space. However, base region 30 may also comprise any of a variety of translucent, polymeric materials that can be processed in situ to encapsulate and/or cover light sources 21 at temperatures and under conditions that will not damage them. When base region 30 consists of such material, it provides additional sealing for the light-producing assembly 20 beneath it. Base region 30 may also be fabricated as a separate part using injection molding tools, equipment and processing conditions, and then sealed over light-producing assembly 20 and light sources 21 using known methods.

As shown in FIG. 2B, the illuminated vehicle emblem assembly 2a lacks a base region 30. However, in some embodiments of assembly 2a, a small air gap may be present between the chromatic layer 40 and the light-producing assembly 20. As such, the chromatic layer 40 is over, or directly in contact with, the light-producing assembly 20 in the emblem assembly 2a.

FIGS. 2A and 2B also illustrate the chromatic layer 40, arranged over the base region 30 for emblem assembly 2, and over the light-producing assembly 20 for emblem assembly 2a. The chromatic layer 40 may be observed through the translucent encapsulation structure 50. Chromatic layer 40 gives illuminated vehicle emblem assembly 2, 2a a chrome- or mirror-like appearance. This appearance is evident when light-producing assembly 20 is not activated, and/or under ambient lighting conditions.

The chromatic layer 40 may be comprised of various metal particles, materials, coatings and/or paint that can produce the desired chrome- or mirror-like appearance. Chromatic layer 40 may take the form of a layer, multi-layer, film, coating or other suitable structure. It is to be understood, however, that chromatic layer 40 should be configured with a tailored density of chromatic materials to ensure that light from light-producing assembly 20 can penetrate it when the emblem assembly 2, 2a is activated in an illuminated state. Materials that may be used in chromatic layer 40 include, but are not limited to, automotive-grade metallic paint, automotive-grade silver paint, and particles or flakes containing indium, silver, chromium and/or aluminum. Preferably, chromatic layer 40 is comprised of indium-containing and aluminum-containing particles.

Chromatic layer 40 may be deposited, formed and/or applied according to various methods known in the paint, coating and metallic layer deposition art. One approach for forming chromatic layer 40 is to employ a coating preparation of the desired chromatic particles in a water, alcohol or other organic solvent-based suspension or solution. The chromatic layer preparation is then used to apply multiple coatings of the chromatic particles or paint as the chromatic layer 40 to the light-producing assembly 20 (e.g., for the emblem assembly 2a configuration), the base region 30 (if a solid material) and/or to the underside of encapsulation structure 50. Applying chromatic layer 40 to the underside of the encapsulation structure 50 is a preferred approach in that it minimizes the incorporation of unwanted dust particles into the layer 40. Other constituents may be added to the chromatic layer 40 to promote bonding to these structures. The solvent, water or alcohol base is then evaporated by curing (e.g., by UV light) or an ambient evaporation process, leaving the chromatic layer 40 adhered to the light-producing assembly 20, base region 30 and/or encapsulation structure 50. Another approach is to stress relieve the light-producing assembly 20, base region 30 and/or encapsulation structure 50 with a relatively low temperature heating or low-level vibration process. A voltage is then applied to the light-producing assembly 20, base region 30 and/or encapsulation structure 50. The final step is to prepare a loading of the chromatic particles (e.g., indium containing particles) and deposit the particles onto the electrified surface of the light-producing assembly 20, base region 30 and/or encapsulation structure 50.

A further approach to forming chromatic layer 40 is to vacuum metalize the layer on encapsulation structure 50, base region 30 and/or the light-producing assembly 20 (e.g., for the emblem assembly 2a configuration). In this case, chromatic layer 40 is comprised of chromium-, aluminum- or other metal-containing particles. A chromatic layer 40 formed by vacuum metallization may also be sealed with a curable, polymeric translucent coating. In addition, chromatic layer 40 may be formed in situ with encapsulation structure 50. For example, chromatic layer 40 could comprise a metalized polymeric film (e.g., a polyethylene terephthalate film) that is draped over an injection mold or cut to the dimensions of such a mold during fabrication of encapsulation structure 50.

Also depicted in FIGS. 2A and 2B is the encapsulation structure 50. As described earlier, encapsulation structure 50 is translucent and provides a water-resistant seal between the backing member 10 and the interior components of illuminated vehicle emblem 2, 2a. Encapsulation structure 50 also seals the light-producing assembly 20, and chromatic layer 40 from the ambient environment. The sealing function of encapsulation structure 50 is particularly important to ensure that excess moisture does not penetrate and cause a short circuit to the light-producing assembly 20 and light sources 21.

FIGS. 3-6 depict additional embodiments of the illuminated vehicle emblem assembly 2. In general, each of these embodiments can be configured according to the schematic and description of the emblem assembly 2 shown in FIGS. 2 and 2A. However, each of these embodiments relies on different light sources 21 within light-producing assembly 20. It is to be understood that various light sources 21 other than those described here may be employed in light-producing assembly 20 to the same or similar effect.

Referring to FIGS. 3, 3A, 3B and 3C, an embodiment of illuminated vehicle emblem assembly 2 is depicted with a light-producing assembly 20 containing an electroluminescent light source assembly 60 substituted for the light source 21. The illuminated vehicle emblem assembly 2 is otherwise configured as described in connection with the emblem assembly 2 depicted in FIGS. 2 and 2A. Optionally, design features 100 may be embedded within encapsulation structure 50 as shown. These features may be fabricated of various materials as known in the art. Further, the features 100 may be translucent, tinted or opaque.

Electroluminescent light source assembly 60 is to be configured according to a multi-layer structure that produces light through electroluminescence. Preferably, electroluminescent assembly 60 is arranged as shown in FIG. 3C. A carbon layer 62 is arranged on a phosphor layer 64. Carbon layer 62 is coupled to a power supply 22 (see FIG. 3A) and serves as a first electrode in the electroluminescent assembly 20 configuration. The phosphor layer 64 may comprise aluminum and silver nitrate materials. A die eyelet structure 66 is arranged under the phosphor layer 64. Finally, a transparent electrode 67 is coupled to power supply 22 and configured under die eyelet structure 66. Transparent electrode 67 may be comprised (as shown in FIG. 3C) of two layers: an indium tin oxide layer 68 and an antimony-tin-zirconium oxide layer 69. Transparent electrode 67 may also be configured with other suitable transparent electrode materials and configurations.

Figure 4:
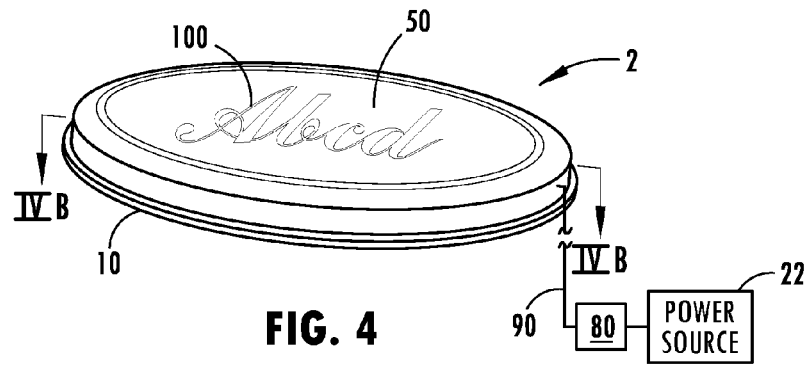
FIG. 4 is a top-down perspective view of an illuminated vehicle emblem assembly, according to a fourth embodiment.
Figure 4A:
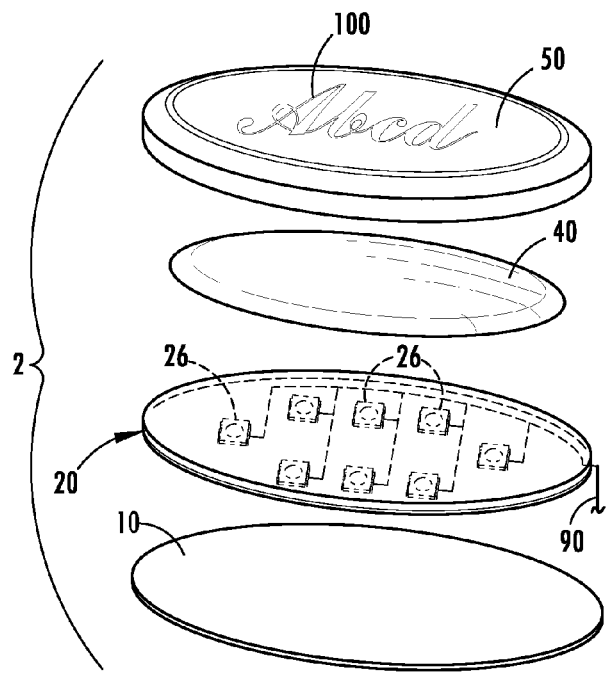
FIG. 4A is an exploded, perspective view of the illuminated vehicle emblem assembly shown in FIG. 4.
Figure 4B:
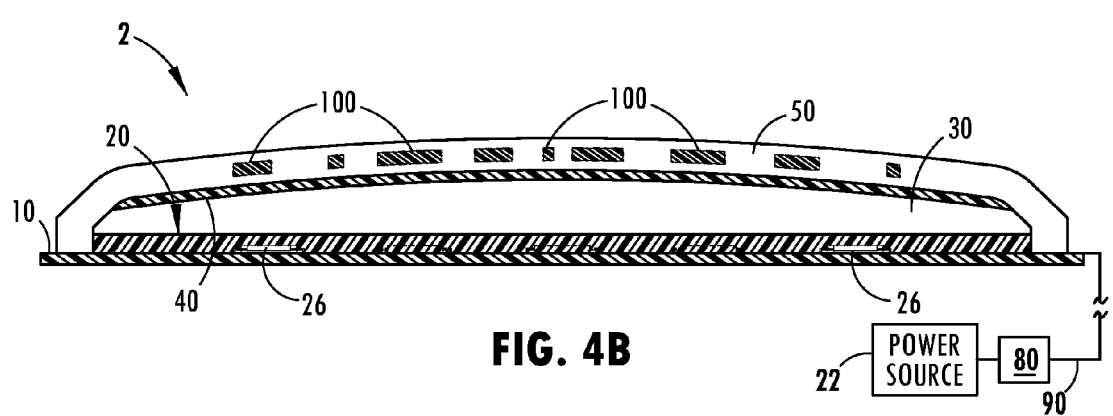
FIG. 4B is a cross-sectional view of the illuminated vehicle emblem assembly shown in FIG. 4.

As depicted in FIGS. 4, 4A and 4B, a further embodiment of illuminated vehicle emblem assembly 2 is depicted with a light-producing assembly 20 that contains light-emitting diode (LED) sources 26 substituted for the light source 21. LED sources 26 may also be configured within light-pipe arrangements (not shown). One or more LED sources 26 may be configured within light-producing assembly 20. Further, LED sources 26 are coupled to, and obtain power for their illumination function from, power supply 22 (see FIG. 4A). It should be appreciated that various types of LED sources, including those that emanate light of different colors, may be employed in this second embodiment. The illuminated vehicle emblem assembly 2 shown in FIGS. 4, 4A and 4B is otherwise configured as described in connection with the schematic of emblem assembly 2 depicted in FIGS. 2 and 2A.

Figure 5:
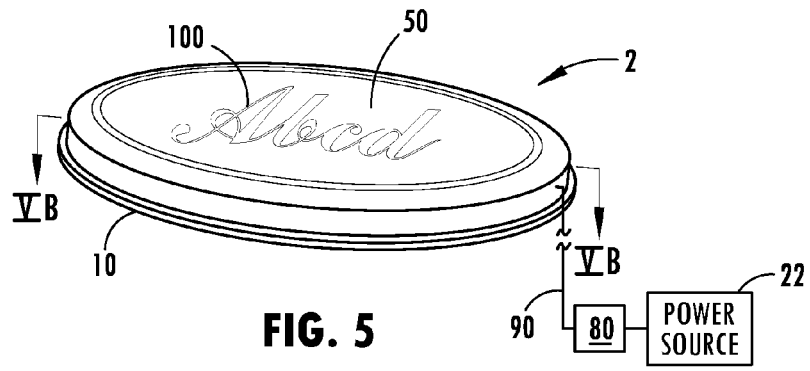
FIG. 5 is a top-down perspective view of an illuminated vehicle emblem assembly, according to a fifth embodiment.
Figure 5A:
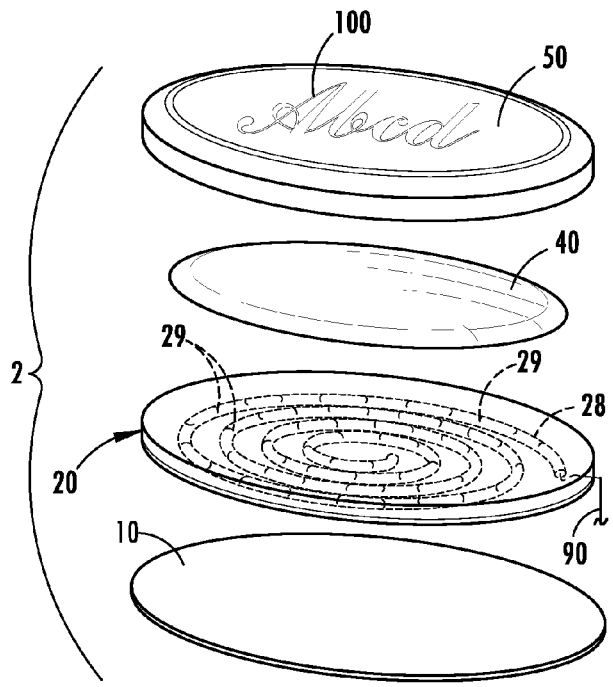
FIG. 5A is an exploded, perspective view of the illuminated vehicle emblem assembly shown in FIG. 5.
Figure 5B:
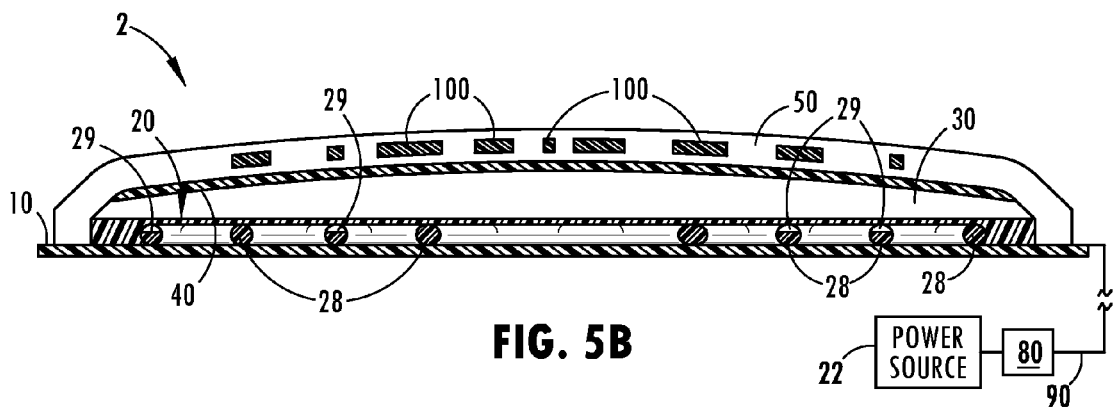
FIG. 5B is a cross-sectional view of the illuminated vehicle emblem assembly shown in FIG. 5.

An additional embodiment of illuminated vehicle emblem assembly 2 is depicted in FIGS. 5, 5A and 5B with a light-producing assembly 20 containing fiber optic light cables 28 substituted for the light source 21. One or more fiber optic light cables 28 may be configured within light-producing assembly 20. In addition, the fiber optic light cable(s) 28 are coupled to, and obtain power for their illumination function from, power supply 22 (see FIG. 5A). Further, slits 29 are provided in fiber optic light cables 28 to ensure that light rays produced within the cables 28 are directed outward through base region 30, chromatic layer 40 and encapsulation structure 50. It should be understood that various types of fiber optic light cables 28, including those that emanate light of different colors, may be employed in this third embodiment. The illuminated vehicle emblem assembly 2 shown in FIGS. 5, 5A and 5B is otherwise configured as described in connection with the schematic of emblem assembly 2 depicted in FIGS. 2 and 2A.

Figure 6:
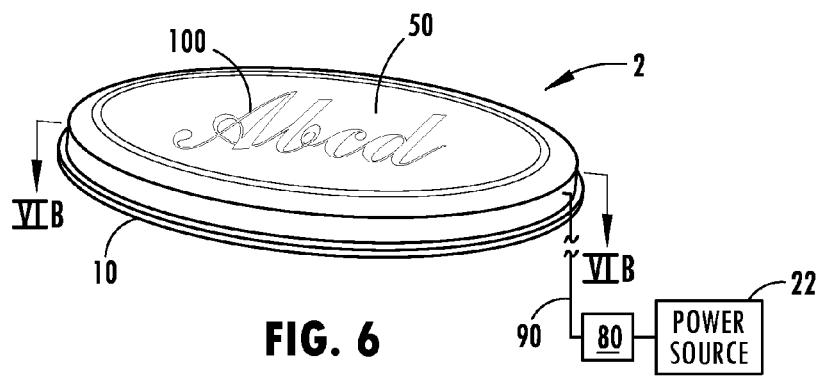
FIG. 6 is a top-down perspective view of an illuminated vehicle emblem assembly, according to a sixth embodiment.
Figure 6A:
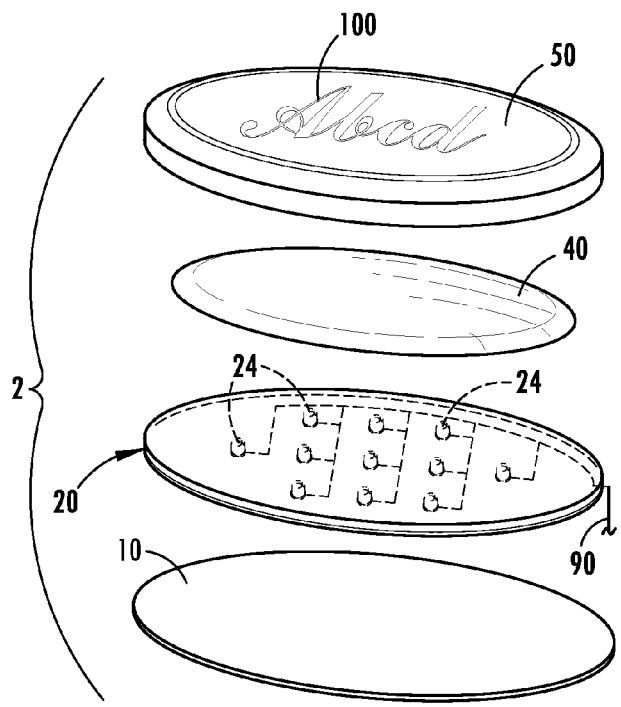
FIG. 6A is an exploded, perspective view of the illuminated vehicle emblem assembly shown in FIG. 6.
Figure 6B:
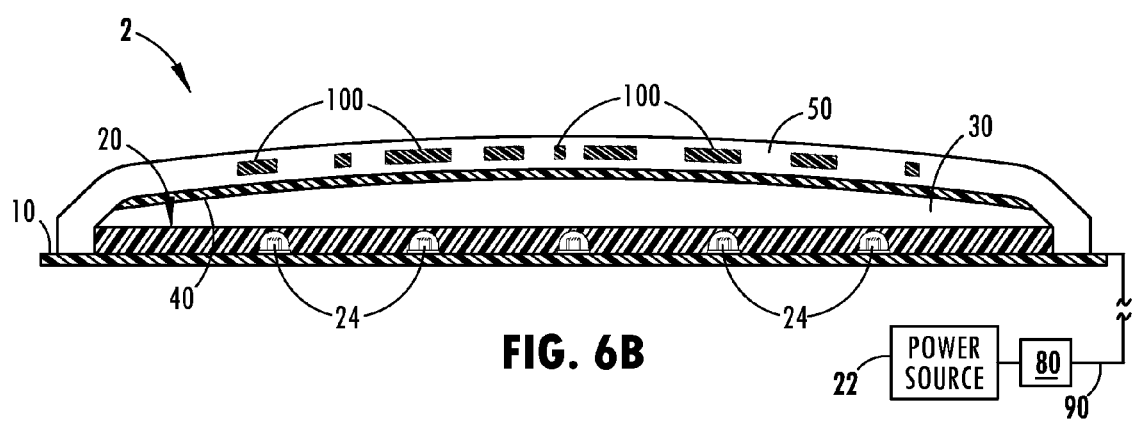
FIG. 6B is a cross-sectional view of the illuminated vehicle emblem assembly shown in FIG. 6.

Referring to FIGS. 6, 6A and 6B, an embodiment of illuminated vehicle emblem assembly 2 is depicted with a light-producing assembly 20 that contains incandescent light bulbs 24 substituted for the light source 21. One or more incandescent light bulbs 24 are configured within light-producing assembly 20. Further, the light bulbs 24 are coupled to and obtain power for their illumination function from power supply 22 (see FIG. 6A). It should be appreciated that various types of incandescent light bulbs and filters, including those that emanate light of different colors, may be employed in this fourth embodiment of illuminated vehicle emblem assembly 2. The illuminated vehicle emblem assembly 2 shown in FIGS. 6, 6A and 6B is otherwise configured as described in connection with the schematic of emblem assembly 2 depicted in FIGS. 2 and 2A.

Figure 7:
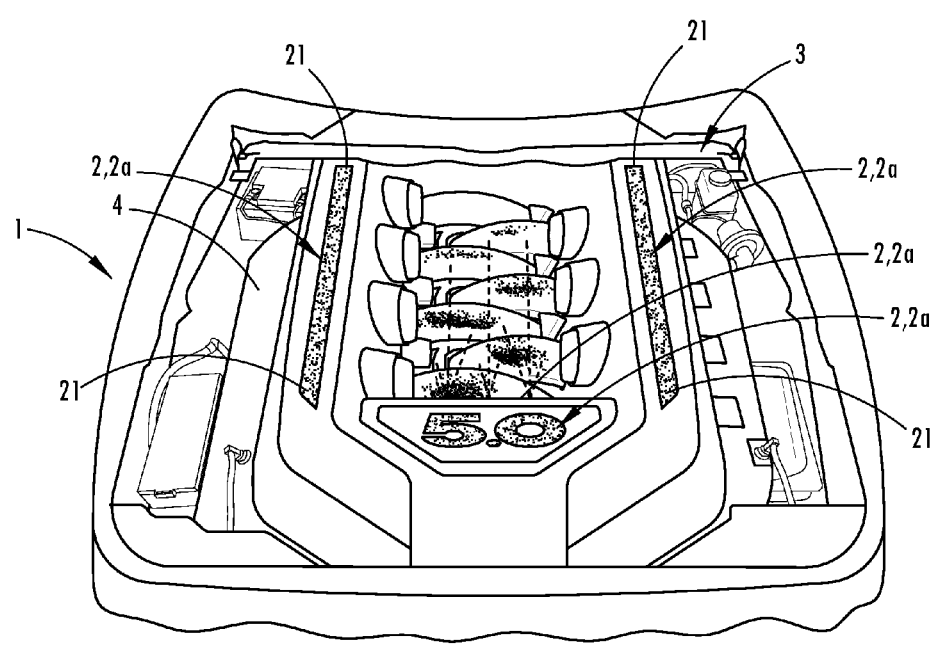
FIG. 7 is a perspective view of the engine compartment of a vehicle (hood removed for clarity) with illuminated emblem assemblies according to the first and second embodiments mounted to an engine at various locations.

As depicted in FIG. 7, illuminated vehicle emblem assemblies 2, 2a can be deployed throughout the engine compartment 3 of the vehicle 1. For example, the assemblies 2, 2a can be deployed as strips on the top surface of engine 4, with light sources 21 at both ends of the assemblies. It is also possible to configure the emblem assemblies 2, 2a into a logo, such as the "5.0" depicted in FIG. 7. As another example, the assemblies 2, 2a can be configured on an interior surface of the head of the engine 4 to illuminate its surface features for aesthetic purposes, as also depicted in FIG. 7.

It should be appreciated that the foregoing embodiments of illuminated vehicle emblem assembly 2 and 2a, and variants of these embodiments, can be employed in various shapes, styles and configurations throughout engine compartment 3 and the interior and exterior of vehicle 1. In particular, the backing member 10 and/or encapsulation structure 50 can be employed in these shapes, styles and configurations. Further, design features 100, such as those employed in the emblem assembly 2 depicted in FIG. 3B, may be embedded within encapsulation structure 50. Under ambient conditions, these design features 100 can appear with a chrome- or mirror-like finish, enhancing the attractiveness of the shape, logo or other graphics evident in the emblem assembly 2, 2a via the appearance of chromatic layer 40. Further, these emblem assemblies 2, 2a may be illuminated by the use of manual switches or other types of controller-driven configurations under low light or nighttime conditions. It is also possible to configure the power supply 22 and wiring arrangement 90 coupled to the light-producing assembly 20 for increased illumination flexibility. Variable intensity lighting options may be employed as light sources 21 in the light-producing assembly 20 including, but not limited to, LEDs, electroluminescent arrays, fiber optic cables and incandescent bulbs. A vehicle emblem assembly 2, 2a configured with variable intensity light sources 21 can be adjusted to produce interesting lighting effects that complement its chrome- or mirror-like finish.

Accordingly, the illuminated vehicle emblem assemblies 2, 2a possess many features that are advantageous in automotive applications. For example, the features that provide the chrome- or mirror-like appearance in the emblem assemblies 2, 2a are protected from the outside environment by the encapsulation structure 50. The chromatic layer 40 and light-producing assembly 20 elements are less susceptible to peeling, flaking and other deterioration. In addition, the glowing appearance of the vehicle emblem assemblies 2, 2a (when activated in an illuminated state) should not be distracting to vehicle operators compared to other, directional lighting sources employed by many other vehicle components. Still further, most of the lighting options for the light sources 21 use little power and can be supported by standard vehicle batteries. Hence, the illuminated vehicle emblem assemblies 2, 2a can be arranged at various locations on the vehicle 1, requiring a wiring connection to a main power bus of the vehicle.

Variations and modifications can be made to the aforementioned structure without departing from the concepts of the present invention, and further such concepts are intended to be covered by the following claims unless these claims by their language expressly state otherwise.

We claim:
1. An emblem assembly, comprising:
   a power source;
   a backing member;
   a light-producing assembly coupled to the power source and supported by the backing member that includes an electroluminescent light source;
   a chromatic layer comprising an emblem shape visible in ambient light over the light-producing assembly; and
   a translucent sealing structure over the chromatic layer that comprises an embedded, non-etched design feature and seals the backing member, the light-producing assembly, and the chromatic layer.
2. An emblem assembly according to claim 1, wherein the chromatic layer comprises aluminum-containing particles.
3. An emblem assembly according to claim 1, wherein the translucent sealing structure comprises glass particles, and an acrylic material, a polycarbonate material, a nylon material, or a blend of these materials.
4. An emblem assembly according to claim 1, wherein the electroluminescent light source comprises a pair of electrode structures and an active phosphor structure.
5. An emblem assembly according to claim 4, wherein the pair of electrode structures include an electrode comprising indium tin oxide material and an electrode comprising carbon material.
6. An emblem assembly according to claim 1, wherein the backing member is mounted to a vehicle.
7. An emblem assembly according to claim 6, wherein the backing member is mounted to a location within an engine compartment of the vehicle and the translucent sealing structure comprises a blend of nylon and polycarbonate material at a ratio of 40 to 60% nylon to 40 to 60% polyester material by weight.
8. An emblem assembly according to claim 1, further comprising:
   an air gap arranged between the light-producing assembly and the chromatic layer.
9. An emblem assembly, comprising:
   a power source;
   a backing member;
   a light-producing assembly coupled to the power source and supported by the backing member that includes a light-emitting diode source;
   a chromatic layer comprising an emblem shape visible in ambient light over the light-producing assembly; and
   a translucent sealing structure over the chromatic layer that comprises an embedded, non-etched design feature and seals the backing member, the light-producing assembly, and the chromatic layer.
10. An emblem assembly according to claim 9, wherein the chromatic layer comprises indium-containing and aluminum-containing particles.
11. An emblem assembly according to claim 9, wherein the translucent sealing structure comprises glass particles, and an acrylic material, a polycarbonate material, a nylon material, or a blend of these materials.
12. An emblem assembly according to claim 9, wherein the backing member is mounted to a vehicle.
13. An emblem assembly according to claim 12, wherein the backing member is mounted to a location within an engine compartment of the vehicle and the translucent sealing structure comprises a blend of nylon and polycarbonate material at a ratio of 40 to 60% nylon to 40 to 60% polyester material by weight.
14. An emblem assembly according to claim 9, further comprising:
   an air gap arranged between the light-producing assembly and the chromatic layer.
15. An emblem assembly, comprising:
   a power source;
   a backing member;
   a light-producing assembly coupled to the power source and supported by the backing member that includes a fiber optic light source;
   a chromatic layer comprising an emblem shape visible in ambient light over the light-producing assembly; and
   a translucent sealing structure over the chromatic layer that comprises an embedded, non-etched design feature and seals the backing member, the light-producing assembly, and the chromatic layer.
16. An emblem assembly according to claim 15, wherein the chromatic layer comprises indium-containing and aluminum-containing particles.
17. An emblem assembly according to claim 15, wherein the translucent sealing structure comprises glass particles, and an acrylic material, a polycarbonate material, a nylon material, or a blend of these materials.
18. An emblem assembly according to claim 15, wherein the backing member is mounted to a vehicle.
19. An emblem assembly according to claim 18, wherein the backing member is mounted to a location within an engine compartment of the vehicle and the translucent sealing structure comprises a blend of nylon and polycarbonate material at a ratio of 40 to 60% nylon to 40 to 60% polyester material by weight.
20. An emblem assembly according to claim 15, further comprising:

an air gap arranged between the light-producing assembly and the chromatic layer.

* * * * *